United States Patent [19]

David

[11] Patent Number: 5,260,415

[45] Date of Patent: Nov. 9, 1993

[54] CROSSLINKING OF POLYMERS CONTAINING DIARYL KETONES

[75] Inventor: Israel A. David, Wilmington, Del.

[73] Assignee: E. I. Du Pont de Nemours and Company, Wilmington, Del.

[21] Appl. No.: 850,090

[22] Filed: Mar. 12, 1992

Related U.S. Application Data

[63] Continuation of Ser. No. 532,415, Jun. 4, 1990, abandoned.

[51] Int. Cl.⁵ .................................................. C08J 3/24
[52] U.S. Cl. ..................................... 528/495; 528/220; 528/232; 528/242; 528/481; 528/487; 528/489; 528/496; 528/503; 428/364; 428/373
[58] Field of Search ............... 528/220, 232, 242, 481, 528/487, 489, 495, 496, 503; 428/364, 373

[56] References Cited

U.S. PATENT DOCUMENTS 4,897,307  1/1990  Beck et al. ........................... 428/398
4,987,171  1/1991  Brugel ................................. 524/396

*Primary Examiner*—Samuel A. Acquah

[57] ABSTRACT

This invention relates to a process for the crosslinking of polymers containing diaryl ketone groups consisting of heating the polymer with an alcohol and/or alkoxide, and optionally exposing the polymer to a strong mineral acid. The crosslinked polymers have enhanced chemical resistance.

38 Claims, No Drawings

CROSSLINKING OF POLYMERS CONTAINING DIARYL KETONES

This is a continuation of Ser. No.: 07/532,415, filed on Jun. 4, 1990, now abandoned.

FIELD OF INVENTION

This invention relates to a process for the crosslinking of polymers containing diaryl ketones by reacting the polymers with alcohols and/or alkoxides and to the products of such process. Such crosslinked polymers have improved properties, such as chemical resistance.

BACKGROUND OF THE INVENTION

It is known in the art that the crosslinking of polymers can improve certain physical properties, such as chemical and solvent resistance, and retention of shape at high temperatures. It is the object of this invention to provide a convenient method for crosslinking polymers containing diaryl ketones, so as to improve such physical properties.

SUMMARY OF THE INVENTION

This invention concerns a process for crosslinking ketone containing polymer, comprising, an optional first step of contacting a diaryl ketone containing polymer with an alcohol and/or alkoxide, at a first temperature of about 50° C. to about 200° C.; and a second step of heating said diaryl ketone containing polymer at a second temperature of about 200° C. or more, or contacting said polymer with a strong dehydrating acid;

provided that:

said first and said second temperatures are about or above the glass transition temperature of said polymer;

when alkoxide is not present, said first temperature is about 150° C. to about 200° C.;

when said strong acid is used in said second step, said first step must be carried out; and when said second step is carried out in the absence of said acid, and said optional first step has not been performed, said second step must be done with said polymer contacting said alcohol and/or said alkoxide.

This invention also relates to the products of said process.

DETAILS OF THE INVENTION

The polymers useful in the present invention are those that contain diaryl ketones. By diaryl ketone is meant a group that has a carbonyl group in which the carbon of the carbonyl group is bound directly to two carbon atoms that are part of aromatic rings. For example, the simplest (monomeric) diaryl ketone is benzophenone, diphenyl ketone. The ketone group may be part of the main chain of the polymer or may be a pendant group. Preferred polymers for this process are poly(etherketoneketone), hereinafter PEKK, and poly(etheretherketone), hereinafter PEEK. The repeat units of these polymers are shown below.

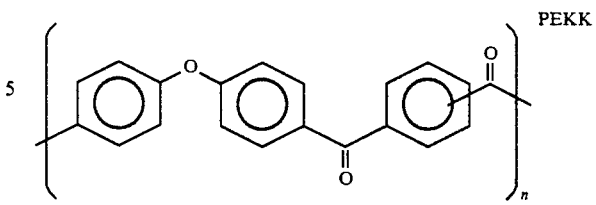

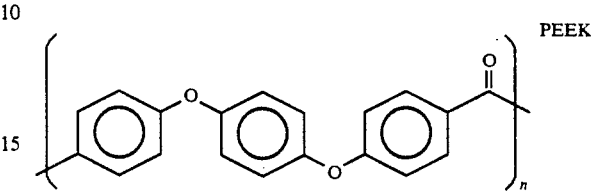

The diaryl ketone containing polymers may contain any substituents that do not react with the other compounds used in the process. The polymers, whether substituted or not, must be substantially stable at the temperatures at which the process is run.

Any primary or secondary alcohol or alkoxide may be used in the first and/or second steps of the process. The alcohol or alkoxide must be substantially stable at the temperature at which the process is run, although small amounts of dehydration are acceptable. Primary alcohols or alkoxides are preferred. It is preferred if the alcohol or alkoxide is polyfunctional, that is contains two or more hydroxyl groups. It is especially preferred if the alcohol is a glycol, that is contains two hydroxyl groups.

If alkoxide is present, a combination of alkoxide and alcohol (alkoxide dissolved in alcohol) will usually be used, since many alkoxides are solids (see also swelling agents, infra). The alkoxide can be formed in situ, as by the reaction of an alkali metal hydroxide, hydride or amide with the alcohol. In preferred alkoxides, the cation is an alkali metal or aluminum.

The ratio of alcohol (plus alkoxide, if present) to polymer in the first step is about 0.05 to about 1 and in the second step is about 0.0001 to about 1 equivalents of alcohol per gram of polymer, preferably about 0.0002 to about 0.5 equivalents of alcohol per gram of polymer in the second step. An equivalent of alcohol (or alkoxide) is the equivalents of hydroxyl groups, including alkoxide. In order to effect crosslinking, it is desirable to maintain the amount of alcohol or alkoxide in actual contact with the polymer to a minimum. The alcohol may be contacted with the polymer as a liquid or vapor. At higher temperatures lower boiling alcohols may be present as vapors, or a pressure vessel may be used to confine the vapor or keep them liquids.

Alcohols (and their derived alkoxides) useful in the process include, but are not limited to, methanol, ethanol, n-propanol, i-propanol, n-butanol, 2-butanol, 2-methyl-1-propanol, xylylene glycol (o-, m- and p-isomers), neopentyl alcohol, 1-heptanol, ethylene glycol, benzyl alcohol, 1,4-butanediol, propylene glycol, penterythritol, trimethylol propane, 1,3-propanediol, 1,5-pentanediol, 1,6-hexanediol, and cyclohexanedimethanol, and 2,2-dimethyl-1,3-propanediol.

The strong dehydrating acid is a concentrated acid that has a tendency to dehydrate organic compounds such as alcohols. Such acids are well known to those skilled in the art. Preferred strong dehydrating acids are sulfuric acid, phosphoric acid, polyphosphoric acid, p-toluenesulfonic acid, methanesulfonic acid, trifluoromethanesulfonic acid, and the like. Sulfuric acid is especially preferred. These acids are usually used from about ambient temperature to about 100° C.

The optional first step of the reaction is carried out at about 50° C. to about 200° C., and above the glass transition temperature of the polymer. The glass transition temperature of a polymer is a property well known to those skilled in the art, and the value for any particular polymer can be found in the literature or measured by well known techniques, such as differential scanning calorimetry. If the glass transition temperature of the polymer is above about 200° C. the first step cannot be done separately. If there is no alkoxide present in the first step, higher temperatures, about 150° C. to about 200° C. must be employed.

The second step of the process, when carried out in the absence of an acid, and when the first step has been carried out, may merely involve heating of the polymer to a temperature over about 200° C. and about or higher than the glass transition temperature of the polymer. If no acid is present and the first step has not been carried out, then alcohol and/or alkoxide must contact the polymer in the second step. The alcohols and alkoxides discussed above are applicable. For the second step carried out in the absence of acid, it is preferred that the temperature is about 230° C. to about 350° C. Typically the amount of time needed to carry out the second step in the absence of acid is inversely proportional to the temperature. Although it will vary somewhat depending on the process ingredients, typical times for the second step are 1 hr at 250° C., 30 min at 300° C. and 15 min at 350° C.

It will be understood by those skilled in the art, that the polymer will be crosslinked at the surface, unless the alcohol/alkoxide and acid (if used) is able to penetrate into the polymer during the process. Thus alcohols that can swell the polymer will typically crosslink not only the surface of the polymer but somewhat below the surface, the exact amount of penetration below the surface being determined by the ability of the alcohol to swell the polymer. There will usually be a "crosslink gradient" wherein the surface is more highly crosslinked than the interior of the polymer pieces. Another determining factor as to whether some crosslinking will occur throughout the polymer is the thicknesses of the polymer pieces, thicker pieces being less likely to be crosslinked in the center of the piece.

In order to assist in crosslinking the polymer below the surface, especially if the alcohol/alkoxide does not swell the polymer well, it is advantageous to add to the process (first and second steps) a swelling agent which swells the polymer. Such agents must of course be substantially stable at the temperature of the process and not react with any of the other ingredients. The use of a swelling agent will aid in the crosslinking of the polymer below the surface whenever acid, alkoxide or alcohol are present. Suitable agents are 1,2,4-trichlorobenzene, methylene chloride and chloroform.

Process steps carried out much above ambient temperatures should be done in the absence of oxygen to avoid oxidation of the process ingredients. If alkoxides or concentrated dehydrating acids are employed large amounts of water should be avoided. It is therefore often convenient to carry out the process under an inert atmosphere, for example nitrogen or argon.

If the process is carried out using the optional first step, the polymer so produced may be formed into parts before performing the second step. For example, for polymers that can be melt processed below about 200° C., typical melt processing techniques may be employed. For polymers that cannot be melt processed below about 200° C., polymer powder may be treated in the first step, and the resulting powder formed into parts by compression and heating before crosslinking occurs. After the second step of the process the polymer should be of the final part configuration, such as a molding, extrusion, composite part, fiber, film, etc. Thus parts of the desired final configuration need only be treated by the second step in the presence of alcohol and/or alkoxide to become crosslinked. Parts that had undergone the first step could be formed into their final shapes before treatment in the second step.

Parts crosslinked by the instant process, such as moldings, fibers and films are especially useful in environments with harsh chemical exposure such as acids. Such uses include filter for furnaces burning high sulfur content coals, protective clothing and engineering parts. They are also particularly useful where shape retention at high temperatures is critical.

In some of the following examples PEEK polymer, grade 380, available from ICI Americas, Wilmington, DE, is used. PEKK polymer was made according to the procedure of U.S. Pat. No. 4,816,556. In the following examples, the polymers are tested for solubility in solvents which would normally dissolve them. If the polymer is insoluble, it is deemed crosslinked.

EXAMPLE 1

PEKK polymer (0.9 g) was heated with 0.14 g (33 mole %) of p-xylylene glycol in a nitrogen atmosphere for 15 min at 360° C. The polymer softened slightly, but did not melt. It was insoluble in hexafluoroisopropyl alcohol at room temperature and sulfuric acid at 100° C., indicating it was crosslinked. Untreated PEKK polymer was molten at 360° C. and was soluble in both hexafluoroisopropyl alcohol and 100° C. sulfuric acid.

EXAMPLE 2

Example 1 was repeated, except that temperatures below the melting point of PEKK polymer were used. Polymers treated at 250° and 200° C. were insoluble in hexafluoroisopropyl alcohol. Polymer treated at 150° C. was soluble. All three polymers were insoluble in sulfuric acid, both at room temperature and at 100° C. This result indicates that even at the lowest temperature used, which is near the PEKK $T_g$ of ~160°-170° C., there was sufficient reaction that the sulfuric acid could cause crosslinking to occur.

EXAMPLE 3

PEEK polymer (0.86 g) was heated with 0.04 g (10 mole %) of p-xylylene glycol in a nitrogen atmosphere for 15 min at 360° C. The polymer gelled, and did not melt. It was insoluble in a 50:50 volume mixture of 1,2,4-trichlorobenzene and phenol at 180° C., indicating it was crosslinked. Untreated PEEK polymer dissolved in this solvent.

EXAMPLE 4

PEKK polymer (15 g) was heated with 0.44 g (10 mole %) of neopentyl alcohol (boiling point 113°-114° C.) at 350° C. under autogenous pressure in a sealed vessel for 15 min. The resulting glassy solid was insoluble and swelled in hexafluoroisopropyl alcohol.

EXAMPLE 5

PEKK film (0.44 g) was heated with 9.1 g (10,000 mole %) ethylene glycol (boiling point 196°–198° C.) and 10 g 1,3,5-trichlorobenzene as swelling agent under autogenous pressure in a sealed vessel at 250° C. for 1 hr. The resulting opacified film was insoluble in sulfuric acid, hexafluoroisopropyl alcohol, and a 50:50 volume mixture of 180° C. 1,2,4-trichlorobenzene and phenol.

EXAMPLE 6

A small section of a PEKK tensile bar (0.67 g) was heated with 14.3 g of methanol (20,000 mole %) and 16 g of 1,3,5-trichlorobenzene under autogenous pressure in a sealed vessel at 250° C. for 1 hr. The resulting tensile bar section was insoluble in 100° C. sulfuric acid, room temperature hexafluoroisopropyl alcohol, and 180° C. 50:50 volume mixture of 1,2,4-trichlorobenzene and phenol.

EXAMPLE 7

PEKK yarn drawn at 2.4x draw ratio (0.73 g) was heated with 15.6 g of methanol 20,000 mole %) and 41.3 g of methylene chloride (20,000 mole %) under autogenous pressure in a sealed vessel at 230° C. for 2 hr. The resulting yarn was insoluble in 180° C. 50:50 volume mixture of 1,2,4-trichlorobenzene and phenol and in 100° C. sulfuric acid.

EXAMPLE 8

PEKK polymer (10 g) was heated with stirring with 0.1 g sodium hydroxide in 100 cc of boiling 1-heptanol for 1 hr. The boiling temperature is 176° C., which is above the PEKK $T_g$ of $\sim 160°-170°$ C. The cooled suspension was filtered, and the solid polymer washed with 1-heptanol and then 2-propanol. It was soluble in hexafluoroisopropyl alcohol, indicating that it was not crosslinked. It was insoluble in sulfuric acid, indicating that it had become crosslinked by that solvent. The washed and air-dried polymer was heated in a nitrogen atmosphere at 350° C. for 15 min. The polymer melted and then solidified, indicating gelation. The resulting gelled polymer was insoluble in hexafluoroisopropyl alcohol at room temperature and in sulfuric acid at 100° C., indicating that the heating had caused it to crosslink.

EXAMPLE 9

A film was pressed at 360° C. and 20,000 lb. for 3 min from the sodium hydroxide/1-heptanol treated polymer of Example 8. The resulting colorless, creasable film was insoluble and swelled in hexafluoro-isopropyl alcohol. Film made the same way from untreated polymer dissolved in this solvent. The crosslinked film was heated in the film press for an additional period of time, and swelling ratios (qm) and elongation in a thermomechanical analyzer (TMA) were measured, with these results:

| Total Heating Time (min.) | $q_m$ | Elongation (%) in TMA at 180° C. |
| --- | --- | --- |
| 3 | 12 | 47 |
| 8 | 7 | 13 |
| uncrosslinked control | ∞ | >200 |

EXAMPLE 10

PEKK yarn drawn at 2.4× draw ratio (0.54 g) was heated in a solution of 0.03 g of sodium hydroxide in 30 cc of 1-heptanol under reflux in a nitrogen atmosphere for 1 hr. The yarn was removed from the solution, washed with 1-heptanol, then 2-propanol, then water, then methanol, and let dry in the air. About one-third of the yarn was then immersed in sulfuric acid, whereupon it turned a very deep, almost black, red. This suspension was heated at 100° C. for 1 hr and then left at room temperature overnight. The yarn was removed from the sulfuric acid, washed with fresh sulfuric acid, then water until the washings were neutral to pH paper, and let dry in the air. The resulting tan fibrids were insoluble in a 50:50 volume mixture of 1,2,4-trichlorobenzene and phenol at 180° C. for 2 hr, and were thus crosslinked.

EXAMPLE 11

A small amount of the alkali-treated polymer of Example 8 (not heated to 350° C.) was immersed in sulfuric acid at room temperature for $\sim 5$ min. On contact with the sulfuric acid, it immediately turned the same color as in Example 10. The suspension was filtered, and the polymer washed and dried on the filter as in Example 10. The resulting slightly off-white (original color) polymer was tested as in Example 10, and found to be crosslinked.

EXAMPLE 12

A suspension of 1.2 g of PEKK polymer in 12 cc of ethylene glycol was heated at the boil ($\sim 197°$ C.) under reflux in a nitrogen atmosphere for 1 hr. There was no visible change in the polymer. The suspension was filtered, and the polymer washed on the filter with ethylene glycol, 2-propanol, and methanol, and let dry on the filter. It was soluble when tested as in Example 11, indicating that it was not crosslinked. This polymer was then heated at 360° C. for 15 min. It melted and then gelled. After this heating, it was insoluble, indicating that it was crosslinked. A film pressed from the unheated polymer at 360° C. for 15 min. had a $q_m$ of 27 in the solvent of Example 10.

Although preferred embodiments of the invention have been described hereinabove, it is to be understood that there is no intention to limit the invention to the precise constructions herein disclosed, and it is to be further understood that the right is reserved to all changes coming within the scope of the invention as defined by the appended claims.

What is claimed is:

1. A process for crosslinking a diaryl ketone containing polymer, comprising contacting a diaryl ketone containing polymer with an alcohol or alkoxide or a mixture of alcohol and alkoxide, at a temperature of about 50° C. to about 200° C. then removing the alcohol or alkoxide or a mixture of alcohol and alkoxide and then contacting said polymer with a strong dehydrating acid; provided that the temperature is about or above the glass transition temperature of said polymer and when alkoxide is not present the temperature is about 150° C. to about 200° C.; and provided further that the polymer is substantially stable at any of the process temperatures.

2. A process for crosslinking a diaryl ketone containing polymer comprising heating the diaryl ketone containing polymer at a temperature of about 200° C. to about 360° C., with the polymer in contact with alcohol or alkoxide or a mixture of alcohol and alkoxide, provided that the polymer is substantially stable at such about 200° C. to about 360° C. temperature, provided also that the temperature is about or above the glass transition temperature of the polymer.

3. A process for crosslinking a diaryl ketone containing polymer comprising:
   a. a first step of contacting the diaryl ketone containing polymer with an alcohol or alkoxide or a mixture of alcohol and alkoxide, at a temperature of about 50° C. to about 200° C., then either removing the alcohol or alkoxide or mixture of alcohol and alkoxide, added in the first step or letting the alcohol or alkoxide or mixture of alcohol and alkoxide added in the first step remain in the reaction mixture; then
   b. a second step of heating the diaryl ketone containing polymer at a temperature of about 200° C. to about 360° C., provided that the polymer is substantially stable at such 200° C. to about 360° C. temperature,
   provided further that all temperatures are about or above the glass transition temperature of the polymer and that in the first step, when alkoxide is not present, the temperature is about 150° C. to about 200° C.

4. The process as recited in claim 3 wherein said alcohol or alkoxide or mixture of alcohol and alkoxide added in the first step is removed and the second heating step is done in the substantial absence of alcohol or alkoxide or mixture of alcohol and alkoxide.

5. The process as recited in claim 1 wherein said polymer is PEEK or PEKK.

6. The process as recited in claim 2 wherein said polymer is PEEK or PEKK.

7. The process as recited n claim 3 wherein said polymer is PEEK or PEKK.

8. The process as recited in claim 2 wherein said heating is carried out at a temperature of about 230° C. to about 350° C.

9. The process as recited in claim 3 wherein said second step is carried out at a temperature of about 230° C. to about 350° C.

10. The process as recited in claim 1 wherein said acid is selected from the group consisting of sulfuric acid, phosphoric acid, polyphosphoric acid, p-toluene-sulfonic acid, methanesulfonic acid and trifluoromethanesulfonic acid.

11. The process as recited in claim 10 wherein said acid is sulfuric acid.

12. The process as recited in claim 1 wherein the ratio of said alcohol plus said alkoxide to said polymer is about 0.0001 to about 1 equivalent per gram of said polymer.

13. The process as recited in claim 2 wherein the ratio of said alcohol plus said alkoxide to said polymer is about 0.0001 to about 1 equivalent per gram of said polymer.

14. The process as recited in claim 3 wherein the ratio of said alcohol plus said alkoxide to said polymer is about 0.0001 to about 1 equivalent per gram of said polymer.

15. The process as recited in claim 12 wherein said ratio is about 0.0002 to about 0.5.

16. The process as recited in claim 13 wherein said ratio is about 0.0002 to about 0.5.

17. The process as recited in claim 14 wherein said ratio is about 0.0002 to about 0.5.

18. The process as recited in claim 1 wherein the ratio of said alcohol plus said alkoxide to said polymer is about 0.05 to about 0.5 equivalents per gram of said polymer.

19. The process as recited in claim 2 wherein the ratio of said alcohol plus said alkoxide to said polymer is about 0.05 to about 0.5 equivalents per gram of said polymer.

20. The process as recited in claim 3 wherein the ratio of said alcohol plus said alkoxide to said polymer in the first step is about 0.05 to about 0.5 equivalents per grams of said polymer.

21. The process as recited in claim 1 wherein said alkoxide is derived rom and said alcohol is selected from the group consisting of methanol, ethanol, n-propanol, i-propanol, n-butanol, 2-butanol, 2-methyl-1-propanol, xylylene glycol (o-, m- and p- isomers), neopentyl alcohol, 1-heptanol, ethylene glycol, benzyl alcohol, 1,4-butanediol, and propylene glycol, penterythritol, trimethylol propane, 1,3-propanediol, 1,5-pentanediol, 1,6-hexanediol, cyclohexanedimethanol, and 2,2-dimethyl-1,3-propanediol or said alkoxide is derived from or said alcohol is selected from the group consisting of methanol, ethanol, n-propanol, i-propanol, n-butanol, 2-butanol, 2-methyl-1-propanol, xylylene glycol (o-, m- and p-isomers), neopentyl alcohol, 1-heptanol, ethylene glycol, benzyl alcohol, 1,4-butanediol, and propylene glycol, penterythritol, trimethylol propane, 1,3-propanediol, 1,5-pentanediol, 1,6-hexanediol, cyclohexanedimethanol, and 2,2-dimethyl-1,3-propanediol.

22. The process as recited in claim 2 wherein said alkoxide is derived from and said alcohol is selected from, the group consisting of methanol, ethanol, n-propanol, i-propanol, n-butanol, 2-butanol, 2-methyl-1-propanol, xylylene glycol (o-, m- and p- isomers), neopentyl alcohol, 1-heptanol, ethylene glycol, benzyl alcohol, 1,4-butanediol, and propylene glycol, penterythritol, trimethylol propane, 1,3-propanediol, 1,5-pentanediol, 1,6-hexanediol, cyclohexanedimethanol, and 2,2-dimethyl-1,3-propanediol or said alkoxide is derived from or said alcohol is selected from the group consisting of methanol, ethanol, n-propanol, i-propanol, n-butanol, 2-butanol, 2-methyl-1-propanol, xylylene glycol (o-, m- and p- isomers), neopentyl alcohol, 1-heptanol, ethylene glycol, benzyl alcohol, 1,4-butanediol, and propylene glycol, penterythritol, trimethylol propane, 1,3-propanediol, 1,5-pentanediol, 1,6-hexanediol, cyclohexanedimethanol, and 2,2-dimethyl-1,3-propanediol.

23. The process as recited in claim 3 wherein said alkoxide is derived from and/or alcohol is selected from the group consisting of methanol, ethanol, n-propanol, i-propanol, n-butanol, 2-butanol, 2-methyl-1-propanol, xylylene glycol (o-, m- and p- isomers), neopentyl alcohol, 1-heptanol, ethylene glycol, benzyl alcohol, 1,4-butanediol, and propylene glycol, penterythritol, trimethylol propane, 1,3-propanediol, 1,5-pentanediol, 1,6-hexanediol, cyclohexanedimethanol, and 2,2-dimethyl-1,3-propanediol.

24. The process as recited in claim 1 wherein said polymer is i the form of a fiber.

25. The process as recited in claim 2 wherein said polymer is in the form of a fiber.

26. The process as recited in claim 3 wherein said polymer is in the form of a fiber.

27. The process as recited in claim 1 wherein said polymer is in the form of a film.

28. The process as recited in claim 2 wherein said polymer is in the form of a film 29. The process as recited in claim 3 wherein said polymer is in the form of a film.

30. The process as recited in claim 1 wherein said polymer is in the form of a molded part, extrusion or composite part.

31. The process as recited in claim 2 wherein said polymer is in the form of a molded part, extrusion or composite part.

32. The process as recited in claim 3 wherein said polymer is in the form of a molded part, extrusion or composite part.

33. The process as recited in claim 1 wherein a swelling agent is present.

34. The process as recited in claim 2 wherein a swelling agent is present.

35. The process as recited in claim 3 wherein a swelling agent is present.

36. The product of the process as recited in claim 1.

37. The product of the process as recited in claim 2.

38. The product of the process as recited in claim 3.

* * * * *